United States Patent [19]

Davies

[11] Patent Number: 5,031,923
[45] Date of Patent: Jul. 16, 1991

[54] VALVE STEM SEAL

[75] Inventor: Timothy C. Davies, Leeds, England

[73] Assignee: Cooper Industries, Inc., Houston, Tex.

[21] Appl. No.: 547,296

[22] Filed: Jul. 3, 1990

Related U.S. Application Data

[63] Continuation of Ser. No. 189,027, May 2, 1988, abandoned.

[30] Foreign Application Priority Data

Mar. 23, 1988 [EP] European Pat. Off. ........ 88302541.3

[51] Int. Cl.$^5$ ...................... F16J 15/20; F16J 15/28; F16J 15/32
[52] U.S. Cl. .................... 277/124; 251/214; 277/102; 277/125; 277/205; 277/207 R; 277/211; 277/236
[58] Field of Search .............. 277/205, 236, 123, 124, 277/125, 102, 207 R, 112, 209, 211; 166/84; 251/214

[56] References Cited

U.S. PATENT DOCUMENTS

| 3,279,806 | 10/1966 | Bialkowski | 277/205 |
| 3,288,472 | 11/1966 | Watkins | 277/205 X |
| 3,527,507 | 9/1970 | Clark et al. | 277/205 X |
| 3,653,670 | 4/1972 | Sifri et al. | 277/205 X |
| 4,345,771 | 8/1982 | Hasegawa et al. | 277/205 |
| 4,371,177 | 2/1983 | Bähr | 277/205 X |
| 4,565,380 | 1/1986 | Newman et al. | 277/205 X |
| 4,576,385 | 3/1986 | Ungchusri et al. | 277/124 |
| 4,630,636 | 12/1986 | Cutcher | 277/124 X |
| 4,658,847 | 4/1987 | McCrone | 277/205 X |

FOREIGN PATENT DOCUMENTS 557047  5/1957  Belgium ............................. 277/205

Primary Examiner—Allan N. Shoap

[57] ABSTRACT

The present invention relates to an improved metal-to-metal seal for a moving stem of a valve and includes a U-shaped ring having a base, an inner leg extending from the inner portion of the base and an outer leg extending from the outer portion of the base. The sealing surface of each leg is flattened and in its free position has a slight angle with respect to the axis of the seal. Each of the legs includes a support enlargement on its sealing side at a point toward the base from the sealing surface and preferably at the position of maximum deflection of the leg. The diameter of such supports is preselected so that in its free state they each are spaced a short distance from the walls against which their leg seals. The end of the outer leg is turned inwardly at an angle.

8 Claims, 3 Drawing Sheets

VALVE STEM SEAL

"This is a continuation of copending application Ser. No. 07/189,027, filed May 2, 1988, now abandoned."

BACKGROUND

The present invention relates to an improved metal-to-metal stem seal for sealing between the exterior of a movable valve stem and the interior of the bore through which the stem extends.

Prior to the present invention there have been many stem seals which have been tried but they have suffered from some disadvantage. For example, some of the prior seals have caused galling of the stem. Others have not provided a continuous seal either due to losing their preferred configuration when exposed to excess pressure either in testing or in service or have worn prematurely so that the metal surfaces no longer were in sealing contact.

An example of a metal-to-metal seal which has been used both in stem sealing applications and in the sealing of the annulus between a casing hanger and the surrounding housing is disclosed in Paper No. OTC 4371 presented at the 14th Annual Offshore Technology Conference in Houston, Tex., May 3-6, 1982 and entitled "Fire Resistant Wellhead Equipment for Statfjord 'B' Platform". The specific metal seal ring which is referred to above is that seal labelled "Primary Seal" in FIG. 7 of such paper. The seal has inner and outer legs extending from a midpoint in the seal ring base portion and diverging from each other. The seal legs end in a reverse curve so that their outer end are convergent with respect to each other. The seal ring labelled "Secondary Seal" us a U shaped seal ring having an energizing ring which urges the outer ends of the seal legs into sealing engagement with the walls of the annulus against which they are to seal.

Another similar shaft seal is disclosed in U.S. Pat. No. 4,471,965 in which the seal ring is U-shaped in section and the two legs each have an outer rounded projection which is intended to make the sealing contact with the surface against which it is to seal.

SUMMARY

The present invention relates to an improved metal-to-metal seal for sealing around a moving stem of a valve and includes a U-shaped ring having a base, an inner leg extending from the inner portion of the base and an outer leg extending from the outer portion of the base. The sealing surface of each leg is flattened and in its free position has a slight angle with respect to the axis of the seal. Each of the legs includes a support enlargement on its sealing side at a point toward the base from the sealing surface and preferably at the position of maximum deflection of the leg. The diameter of such supports is preselected so that in its free state they each are spaced a short distance from the walls against which their leg seals. The end of the outer leg is turned inwardly at an angle.

An object of the present invention is to provide an improved valve stem seal which will withstand substantial test pressures without any reduction in the metal-to-metal seal provided by the seal ring.

Another object is to provide an improved valve stem seal which provides a metal-to-metal seal around a moving valve stem without any galling.

A further object is to provide an improved metal valve stem seal which can maintain its sealed position through heightened pressures and movements of the valve stem.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
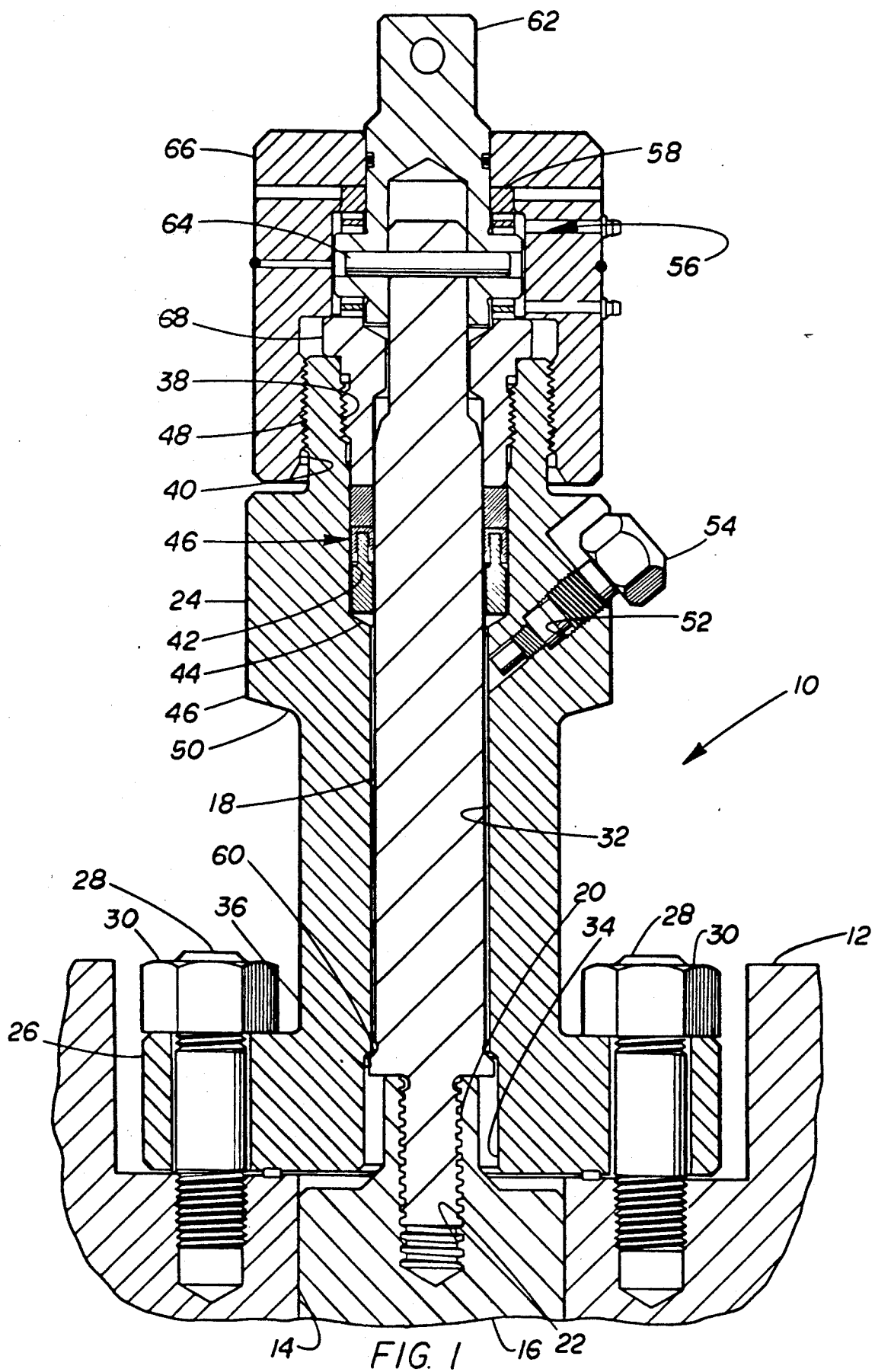
FIG. 1 is a sectional view through the bonnet and valve stem of a moving stem valve with the improved seal installed around the stem and within the bore through the bonnet.

Valve 10 illustrated in the drawings is a gate valve having a body 12 which defines a gate chamber 14 and having gate 16 positioned therein to control flow through valve 10 in the usual manner. Valve 10 is a rotating stem gate valve and stem 18 is threaded into gate 16 so that rotation causes gate 16 to move in chamber 14 between positions closing flow through valve body 12 or opening flow through valve body 12. Stem threads 20 engage threads 22 within gate 16 so that rotation of stem 18 causes the desired movement of gate. In the position illustrated in FIG. 1 gate 16 is in its upper position and such position may either close or open flow through valve body 12 depending on the placement of the opening in gate 16. From this position, the rotation of stem 18 by suitable means (not shown) engaging its outer end causes gate 16 to move away from bonnet 24 to its opposite position. Thereafter, rotation of stem 18 in the opposite direction causes it to return to the illustrated position.

Bonnet 24 includes flange 26 through which suitable connecting means extend, such as studs 28 and nuts 30, to secure bonnet 24 to the exterior of valve body 12 in covering relationship to the opening of chamber 14. Central bore 32 extends through bonnet 24 and counterbore 34 extends into the inner end of bonnet 24 and ends in backseat shoulder 36. The outer interior of bonnet 24 includes inner threads 38, counterbore 40 and counterbore 42 which defines the recess 44 in which improved seal assembly 46 is positioned. Exterior threads 48 surround the outer end of bonnet 24 and enlargement 50 is positioned in surrounding relationship to the sealing area of seal 46. Port 52 extends through enlargement 50 and communicates into central bore 32 immediately below recess 44. Fitting 54 is secured within the opening of port 52 and may be suitable for lubricating the interior within bonnet 24 or for pressure testing.

The outer end of stem 18 includes suitable bearing means 56 providing the rotary mounting of stem 18 and fusible material 58 which provides for the backseating of stem shoulder 60 on backseat shoulder 36 when the valve is subjected to excess heat. Stem extension 62 is secured to the outer end of stem 18 by pin 64 and extends outwardly through cap 66 which is threaded onto external threads 48 on the outer exterior of bonnet 24. Seal assembly 46 is positioned within recess and is held therein by follower ring 68 which is threaded into internal threads 38 of bonnet 24 as shown in FIG. 1. The outer end of stem extension 62 is provided with a suitable shape to allow connection of a suitable means (not shown) to cause the rotation of stem 18, either manually as with a handwheel or mechanically with a suitable power drive.

Seal assembly 46 which is shown in greater detail in FIG. 2, includes seal ring 70 as hereinafter described, backup ring 72, which is positioned between the inner end of packing gland 68 and seal ring 70, and locating ring 74. Backup ring 72 is metal and annular in shape with suitable inner and outer diameters so that it fits easily into recess 44. The thickness of backup ring 72 is selected so that when packing gland 68 is threaded completely into threads 38 in bonnet 24, seal ring 70 is positioned within recess 44 so that its sealing portions are in engagement with sealing surface 76 on the interior of bonnet 24 and with sealing surface 78 on the exterior of stem 18. Locating ring 74 is positioned within recess 44 at a position so that its inner end engages the shoulder between the end of recess 44 and bore 32. Locating ring 74 includes a base portion 80 and upstanding rim 82 which extends upwardly between inner leg 84 and outer leg 86 of seal ring 70 and engages the base portion 88 of seal ring 70 to further ensure that seal ring is properly positioned within recess 44.

Figure 3:
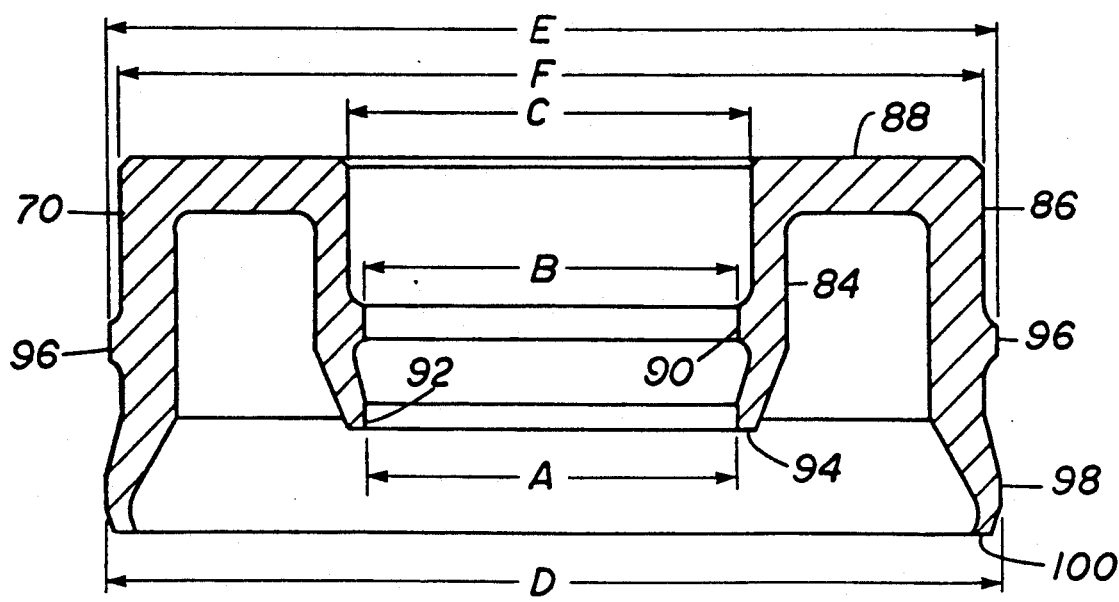
FIG. 3 is a detail sectional view of the improved seal.
Figure 4:
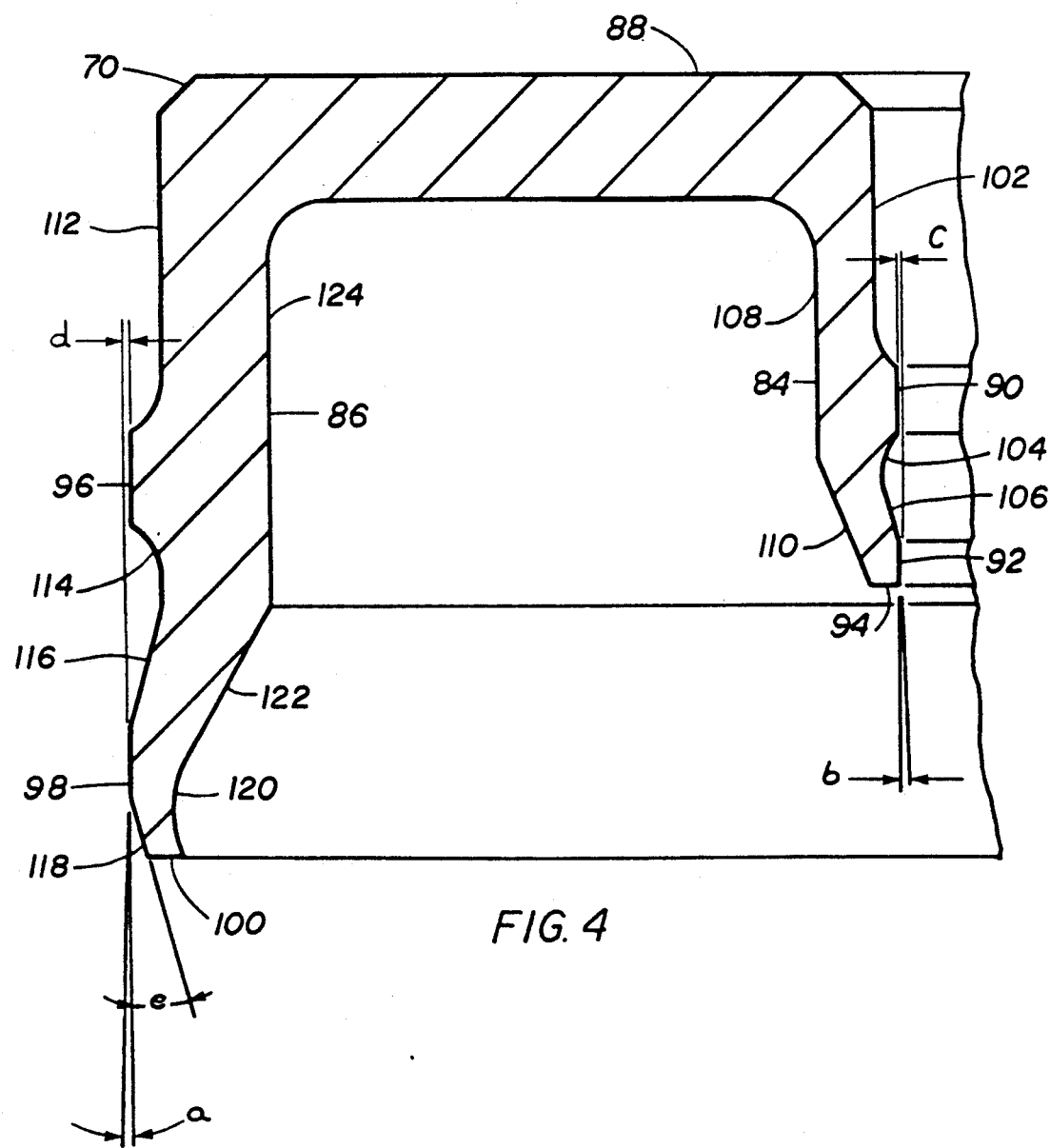
FIG. 4 is an enlarged cross section of the seal ring with the remainder of the ring being omitted for clarity.

Seal ring 70 is best seen in FIGS. 3 and 4. It includes base portion 88 from which inner leg 84 and outer leg 86 extend as shown. The diameters of base portion 88 are such that it can be inserted within recess 44 and have a small clearance from the walls of the bonnet interior 76 and stem 18. As shown in FIG. 3, diameter C will always be greater than the outer diameter of stem 18 and diameter F will always be less than the inner diameter of sealing surface 76 within bonnet 24.

Inner leg 84 has its inner cylindrical surface 102 extending axially from the inner surface of base portion 88 to its approximate mid point where it extends inwardly to support surface 90 which is parallel to the axis. Arcuate interior concave surface 104 extends from the outer end of support surface 90 to interior tapered surface 106 which extends radially inwardly and axially away from base 88 to frusto-conical sealing surface 92 which is at a slight angle "b" to the axis of the seal ring 70 as hereinafter described. The outer cylindrical surface 108 of inner leg 84 extends axially to a point beyond support surface 90 to tapered exterior surface 110 which tapers radially inwardly and axially away from base 88 to the distal end 94 of inner leg 84. Outer leg 86 has its outer surface 112 extending axially away from base portion 88 to its approximate mid point where it extends outwardly to support surface 96 which is parallel to the axis of the seal ring 70. Exterior arcuate recess 114 extends from the outer end of support surface 96 to exterior tapered surface 116 which extends radially outwardly and axially away from base 88 to frusto-conical sealing surface 98 which is at a slight angle "a" outwardly to the axis of the seal ring 70 as hereinafter described. Exterior tapered surface 118 extends from the axially outer portion of sealing surface 98 radially inward and axially away from base 88 at angle "e" to distal end 100 of outer leg 86. The inner cylindrical surface 124 of outer leg 86 extends axially away from base 88 to a point beyond support surface 96 to tapered interior surface 122 which tapers radially outwardly and axially away from base 88 to arcuate interior surface 120. Arcuate interior surface 120 extends from the axially outer end of tapered interior surface 122 away from base 88 to distal end 100. Separate surfaces 90 and 96 preferably are located at the point of maximum deflection of their respective seal legs 84 and 86.

Figure 2:
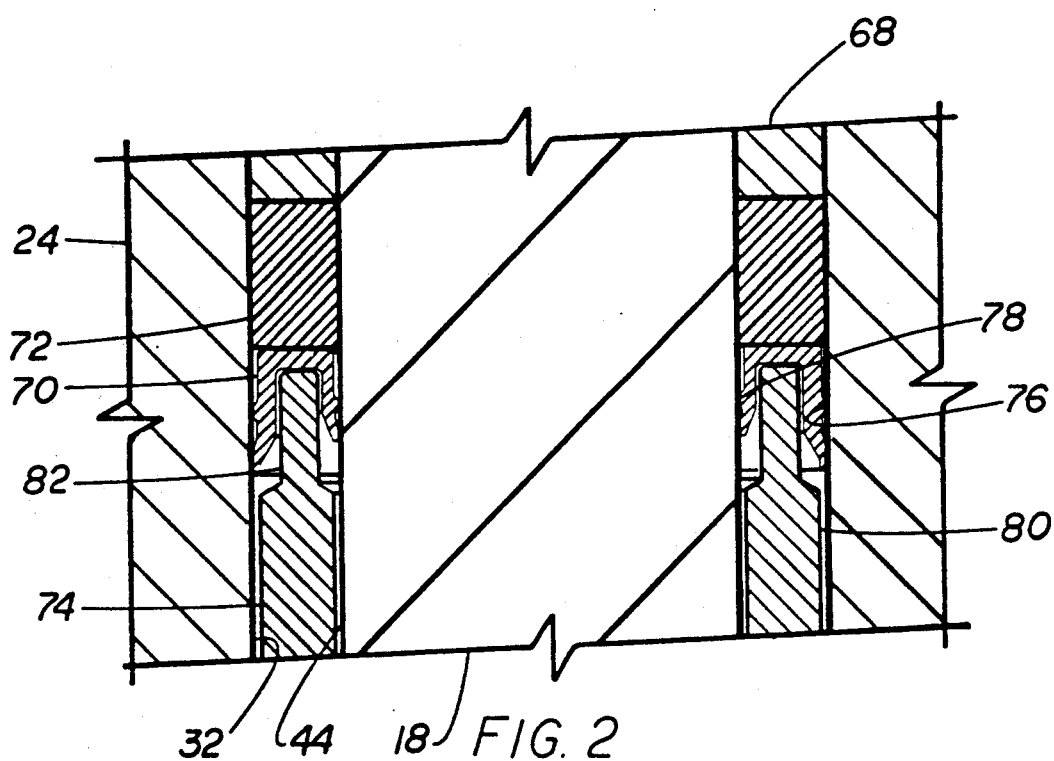
FIG. 2 is an enlarged sectional view of the seal shown in FIG. 1.

As shown in FIGS. 2, 3, and 4 diameter A of inner sealing surface 92 is preferably less than the diameter of the exterior of stem 18 and diameter D is preferably larger than the diameter of sealing surface 76 on the interior of bonnet 24. Diameter B, which is the diameter of support surface 90, is greater than diameter A and also slightly greater than the diameter of the exterior of stem 18. Diameter E, which is the diameter of support surface 96, is less than diameter D and also is slightly less than the diameter of sealing surface 76 on the interior of bonnet 24. Diameter C, which is the diameter of the interior of base portion 88 and inner leg 84, is larger than the exterior of stem 18. Diameter F, which is the diameter of the exterior of base portion 88 and of outer leg 86, is less than the diameter of the interior of bonnet 24. Sealing surface 92 on inner leg 84 is tapered with respect to the axis inwardly by the angle b and sealing surface 98 on outer leg 86 is tapered with respect to the axis outwardly by the angle a. The radial difference between support surface 96 and sealing surface 98 on outer leg is dimension d and the radial difference between support surface 90 and sealing surface 92 is dimension c, all as shown in FIG. 4.

In the following chart suggested relationship of dimensions for a 3 inch diameter stem which is positioned within a 3¾ inch diameter bore

| A | 2.992" | B | 2.999" | C | 3.042" |
|---|---|---|---|---|---|
| D | 3.762" | E | 3.755" | F | 3,712" |
| a | 1° 35' | b | 1° 35' | c | 0.0035" |
| d | 0.035" | e | 15° | | |

From the foregoing it can be seem that the improved seal provides a positive metal-to-metal seal against the exterior of the stem and the interior of the bonnet bore which is designed so that each of the seal legs is provided with a support surface so that even when they are exposed to test pressures of substantial magnitude, such as 10,000 psi, the pressure urging the legs against their sealing surfaces will not cause permanent deformation of the legs.

What is claimed is:

1. A seal for sealing between the exterior surface of a movable valve stem and the interior surface of the bonnet bore through which the stem extends comprising an annular metal ring being U shaped in section and having an annular base extending transversely to the axes of the stem and bore, an inner leg extending axially from the inner peripheral portion of the base and an outer leg extending axially from the outer peripheral portion of the base in the same direction as said inner leg, said outer leg being longer than said inner leg, said inner leg and outer leg extending axially away from said base to distal ends, said outer leg having an exterior cylindrical surface extending axially away from said annular base, an exterior cylindrical support surface connected to the outer axial end of said exterior cylindrical surface away from said base, an exterior arcuate recess extending from the outer portion of said exterior support surface, a first tapered exterior surface connecting to said arcuate recess and extending radially outwardly and axially away from said base, an exterior frusto-conical sealing surface connecting to the axially outer end away from said base of said tapered exterior surface and having a diameter slightly larger than said exterior support surface, a second exterior tapered surface extending from the axially outer portion of said exterior sealing surface radially inward and axially away from the base, said outer leg having an interior cylindrical surface extending axially away from said base, a tapered interior surface extending from the axially outer portion of said interior cylindrical surface away from said base and commencing at a point radially inward of the start of said first exterior tapered surface, said interior tapered surface extending radially outward and axially away from said base, and an arcuate interior surface extending from the axially outer end of said interior tapered surface away from said base and ending at the distal end of said outer leg with the surface extending generally radially inwardly and axially away from said base, said inner leg having an interior cylindrical surface extending axially away from said annular base, an interior cylindrical support surface connected to the axially outer end of said interior cylindrical surface away from said base, an arcuate interior concave surface extending from the axially outer portion of said interior support surface away from said base, an interior tapered surface extending radially inwardly and axially away from said base from the outer portion of said arcuate interior surface, an interior frusto-conical sealing surface having a diameter slightly smaller than said interior support surface of said inner leg extending from the axially outer end of said interior tapered surface away from said base and ending in the distal end of said inner leg, the exterior portion of said inner leg having a first exterior cylindrical surface extending from said base and a tapered exterior surface extending from the axially outer portion of said first exterior cylindrical surface away from said base of said inner leg from a point radially outward from said arcuate concave interior surface to the distal end of said inner leg,
said seal ring adapted to be positioned between the exterior stem surface and the interior surface of the bonnet bore with its inner and outer legs extending in the direction toward the source of pressure from the valve.

2. A seal according to claim 1 wherein, said support surfaces of said inner and outer legs being positioned at the point of maximum deflection of said legs.

3. A seal according to claim 2 including means for retaining said seal ring in its desired position between the exterior surface of the stem and the interior surface of the bonnet bore.

4. A seal according to claim 3 wherein said retaining means includes
means secured to said bonnet and limiting the outward movement of said seal ring from its desired position.

5. A seal according to claim 4 including
a back-up ring positioned between the surface of said base opposite from said inner and outer legs and said movement limiting means.

6. A seal according to claim 5 including
a locating ring positioned in the annular space between the exterior surface of the stem and the interior surface of the bonnet bore and having a central projection extending into a position engaging the base between the inner and outer legs of said seal ring.

7. A seal according to claim 1 wherein, the frusto-conical exterior sealing surface of said outer leg before installation, tapers radially inwardly and axially toward said annular base at an angle of approximately one and one-half degrees.

8. A seal according to claim 4 wherein,
the interior frusto-conical sealing surface of said inner leg before installation, tapers radially outwardly and axially toward said annular base at an angle of approximately one and one-half degrees.

* * * * *